(No Model.)
H. F. FULLER.
METHOD OF AND APPARATUS FOR GENERATING ACETYLENE GAS.
No. 575,677. Patented Jan. 19, 1897.
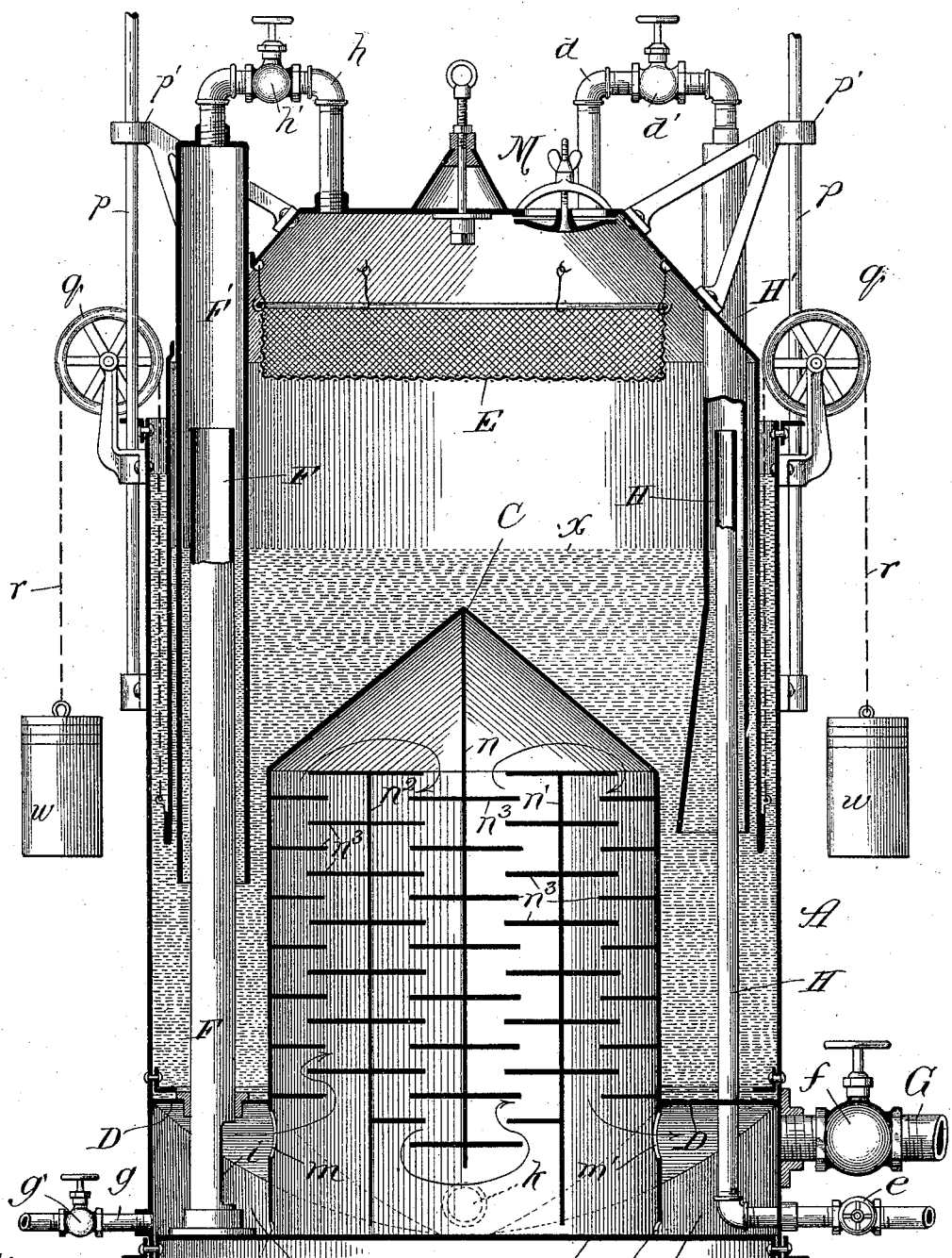
Witnesses: Chas. E. Gaylord, Luti J. Peter
Inventor: Henry F. Fuller,
By Dyrenforth & Dyrenforth, Attys.

UNITED STATES PATENT OFFICE.

HENRY F. FULLER, OF CHICAGO, ILLINOIS, ASSIGNOR TO THE WALMSLEY, FULLER & COMPANY, OF SAME PLACE.

METHOD OF AND APPARATUS FOR GENERATING ACETYLENE GAS.

SPECIFICATION forming part of Letters Patent No. 575,677, dated January 19, 1897.

Application filed November 2, 1896. Serial No. 610,852. (No model.)

*To all whom it may concern:*

Be it known that I, HENRY F. FULLER, a citizen of the United States, residing at Chicago, in the county of Cook and State of Illinois, have invented a new and useful Improvement in the Method of and Apparatus for Generating Acetylene Gas, of which the following is a specification.

In generating acetylene gas by attacking calcium carbid with water the operation is greatly facilitated by heating the water, so as to produce steam or vapor and employ the latter to contact with the calcium carbid and evolve the acetylene gas. While this may be done by the application to the generator of extraneous heat, it is neither convenient nor economical to accomplish the result in that way.

My primary object is to provide a convenient and economical method of heating the water in an acetylene-gas generator to evolve therefrom steam or vapor for attacking the calcium carbid, and this I accomplish by employing for the purpose the heat of the gas, self-generated therein by the chemical action in evolving the gas from the materials employed for the purpose. After the gas has been evolved it should be mechanically scrubbed to remove impurities, particularly moisture, carried by it. As this involves the provision of a mechanical scrubbing attachment, I take advantage of the necessity of providing it by adapting it to the twofold purpose of a scrubber and a medium for taking up the heat from the gas while undergoing the scrubbing operation and transmitting such heat to the water-supply in the generator, and to this end I immerse the scrubber in the body of liquid contained in the generator for acting upon the calcium carbid.

Accordingly my invention consists in the improved method I employ for automatically heating the water in the generator for generating the steam or vapor for attacking the calcium carbid to evolve acetylene gas; and it also consists in the general as well as the more specific construction of the apparatus.

The accompanying drawing shows, by a view in sectional elevation, a gas-generator of my improved construction, adapting it for the practice of my improved method.

A is the outer tank, and B is the inner tank, affording the gas-holder, movably supported in place by chains $r$, passing over stationary pulleys $q$ and carrying counterbalance-weights $w$ on their depending ends, and guide-rods $p$ are shown extending upward from the outer sides of the tank A through guides $p'$, projecting from the top of the tank B to afford means for guiding the inner tank in its movements. From the bottom $o$ of the outer tank there rises within it the scrubber C, shown as a cylindrical chamber, formed of metal, having a conical top and containing vertical partitions, the central one $n$ depending from the apex of the top short of the bottom of the scrubber, and the lateral ones $n'$ and $n^2$ each extending from a point below the top nearly to the bottom, and from the inner sides of the walls of the chamber and the opposite sides of the diaphragms or partitions there extend horizontally the baffle-plates $n^3$, so relatively arranged as to cause the members of each vertical series to alternate with those of the next adjacent series.

In the annular space between the outer tank A and the chamber C is formed the hopper-shaped bottom D, converging from opposite sides of the space to the center of the base $o$ and affording underneath the chambers D' and D$^2$, with the former of which the chamber C communicates through the larger upper opening $m$ and the lower smaller opening $l$ in its wall, and with the latter of which said chamber communicates through corresponding openings $m'$ and $l'$ in its wall. Adjacent to the converging center of the hopper-bottom D there are provided, at opposite points in the wall of the tank A, openings $k$ for the discharge of sediment, (lime,) only one of these openings being indicated, however, owing to the nature of the view selected for illustration. The hopper shape of the bottom D tends to direct to the center thereof all sediment (lime) forming the residue from the calcium carbid contained in the holder E, most of which is precipitated upon the top of the chamber C, whence it is shed, owing to the slanting form of the top, to precipitate to the bottom D.

F is a stand-pipe rising from the base of the outer tank and provided in the chamber D' with an opening $i$, through which it communicates with the scrubber C. The pipe F enters and telescopes with a pipe F', which depends through the top of the inner movable tank B, with which it communicates from its upper end through a pipe $h$, containing a shut-off valve $h'$. A pipe $g$, containing a shut-off valve $g'$, is provided to extend from an opening at a low point in the chamber D' for carrying off condensation. G is the gas-outlet pipe, containing a shut-off valve $f$ and extending from an opening in the chamber $D^2$ to any desired point, (of storage or consumption.) A pipe H leads into the chamber $D^2$ through the wall of the tank A, beyond which it is equipped with a shut-off valve $e$, and extends upward into the tank B, in which it telescopes with a pipe H', which should flare toward its lower end, as shown, and which depends through the top of the inner tank and is connected from its outer end with the latter through a pipe $d$, containing a shut-off valve $d'$.

The operation is as follows: To start the apparatus, water is introduced in desired quantity through a suitable pipe connection or by a hose passed through the manhole, the water-line being indicated at $x$, and the holder E is filled with the calcium carbid through the manhole shown at M, whereupon the manhole is closed and the valves $d'$ and $e$ are opened to permit the escape of air confined in the tank B above the water-level therein. The valve $d'$ is then closed, but the valve $e$ should be left open during the operation of the apparatus. The inner tank drops by its own weight till the holder E and its contents come into contact with the water, whereupon the evolution of acetylene gas immediately takes place, the gas passing off through the pipe $h$ (the valve in which has been preparatorily opened) and pipes F' and F out through the opening $i$ into the chamber D' and thence, at the opening $m$, into the scrubber C and through the latter, escaping therefrom at the opening $m'$ into the chamber $D^2$, from which it is led off at the pipe G. Condensation from the gas in the pipe F and scrubber C may be drawn off from time to time through the pipe $g$.

In passing through the scrubber the heat generated in the gas by the chemical action in its formation, and which is very great, is conducted off through the scrubber-wall and transmitted to the surrounding body of water, causing the heated portion thereof to rise to the surface and be given off as vapor or steam, which thereafter attacks the calcium carbid in the holder and may be alone depended on for producing the continuation of the gas-generation so long as the supply of calcium carbid holds out, thus without requiring that the solid material be again brought into direct contact with the body of water.

Should the generation of gas proceed so much faster than the consumption thereof as to create an undue quantity in the tank B, sufficient to lift it out of the tank A, this will be obviated by the pipe H', since as soon as the lower flaring end thereof shall be raised, by the ascent of the inner tank, beyond the water-level the pressure will be relieved by rushing through the pipe H' into the pipe H and thence out to any desired point to which the last-named pipe may be caused to lead. This arrangement thus affords a safety-vent for the apparatus as well as an escape for the air.

What I claim as new, and desire to secure by Letters Patent, is—

1. The method of continuing the generation of acetylene gas from calcium carbid and water after an initial generation, which consists in conveying the generated gas through a conduit immersed in a body of water, thereby vaporizing the water by the heat of generation in the gas, and bringing the vapor thus obtained into contact with calcium carbid, substantially as described.

2. The herein-described method of producing acetylene gas which consists in bringing water into contact with calcium carbid, and thereafter conveying the generated gas through a conduit immersed in a body of water, thereby vaporizing the water by the heat of generation in the gas, and bringing the vapor thus obtained into contact with calcium carbid, substantially as described.

3. The method of continuing the generation of acetylene gas from calcium carbid and water, after an initial generation, which consists in scrubbing the gas and thereby abstracting its heat of generation, conducting the abstracted heat into water, thereby vaporizing the same, and bringing the vapor thus obtained into contact with calcium carbid, substantially as described.

4. In a gas-generator of the character described, the combination with the outer tank for containing water, and an inner movable tank, of a holder for the solid material supported in the upper part of the inner tank, an outlet for the generated gas, a telescoping stand-pipe communicating with the upper portion of the inner tank and communicating by a tortuous passage within the water and below the normal level thereof with said outlet, substantially as described.

5. In an apparatus for generating acetylene gas from water and calcium carbid, the combination of the outer tank and the inner tank, a scrubber having a conical top and immersed in the body of water contained in the apparatus, an outlet for the generated gas, and a telescoping stand-pipe communicating with the upper portion of the inner tank and with said outlet through the scrubber, substantially as described.

6. In an apparatus for generating acetylene gas from water and calcium carbid, the combination of the outer tank and the inner tank, a holder for the solid material in the upper part of the inner tank, an outlet for the generated gas, a telescoping stand-pipe communicating with the upper portion of the inner tank and communicating by a tortuous passage within the water and below the normal level thereof with said outlet, and extending through said tanks, and a telescoping combined air-vent and safety-pipe communicating with the upper end of the inner tank and leading through said tanks out of the apparatus, substantially as described.

7. In a gas-generator of the character described, the combination with the outer tank for containing water, and the inner, movable tank, of a holder for the solid material supported in the upper part of the inner tank, a conduit communicating with the upper part of the inner tank, a gas-holding tank secured within the lower tank, forming with the wall thereof a water-space, and into which said conduit leads, and an outlet for the generated gas leading from said gas-holding tank, substantially as described.

8. In a gas-generator of the character described, the combination with the outer tank for containing water and an inner movable tank, of a holder for the solid material supported in the upper part of the inner tank, a conduit communicating with the upper portion of the inner tank, a scrubber C provided with deflecting-plates, secured within the lower tank and extending below the normal water-level and into which said conduit leads, and an outlet for the generated gas leading from said scrubber, substantially as described.

9. A gas-generator comprising, in combination, the water-tank A having the hopper-shaped bottom D, provided with a discharge-outlet, the gas-outlet G and the condensation-outlet $g$, the scrubber C rising from the base of the water-tank, stand-pipe F communicating from near its lower end with the gas-outlet through said scrubber, the inner movable tank carrying the pipe F' telescoping with said stand-pipe and having a valve-controlled pipe connection $h$ with said inner tank through its top, a valve-controlled pipe H extending upward in the generator from near its base, and a pipe H' carried by the inner tank and telescoping with said pipe H and having a valve-controlled pipe connection $d$ with said inner tank through its top, the whole being constructed and arranged to operate, substantially as described.

HENRY F. FULLER.

In presence of—
J. H. LEE,
R. T. SPENCER.